F. A. GESELL.
CONTROLLING MEANS FOR SAVING SYSTEMS COMBINED WITH INSURANCE PROTECTION.
APPLICATION FILED SEPT. 10, 1918.

1,329,120.

Patented Jan. 27, 1920.

DEPOSIT SHEET

This is a _Savings & Insurance_ account.

Deposit book and account number 776

Monthly deposit due on the __16__ day of each deposit month. Monthly deposits can be made in advance; however, advance deposits cannot be made beyond the 12th. month of the current deposit year.

| Column 1<br>Monthly deposit number | Column 2<br>Deposits Total | Column 3<br>Amount depositor can withdraw | Column 4<br>Deposit for month of | Credited by |
|---|---|---|---|---|
| 1 | 15.75 | 5.94 | ACCOUNT NO. 776<br>MONTH _Sept_ REC'D BY _R Roe_ | |
| 2 | 31.50 | 21.69 | ACCOUNT NO. 776<br>MONTH _October_ REC'D BY _R Roe_ | |
| 3 | 47.25 | 37.44 | ACCOUNT NO. 776<br>MONTH _Nov_ REC'D BY _R Roe_ | |
| 4 | 63.00 | 53.19 | ACCOUNT NO. 776<br>MONTH _Dec_ REC'D BY _R Roe_ | |
| 5 | 78.75 | 68.94 | _January_ | _R Roe_ |
| 6 | 94.50 | 84.69 | | |
| 7 | 110.25 | 100.44 | | |
| 8 | 126.00 | 116.19 | | |
| 9 | 141.75 | 131.94 | | |
| 10 | 157.50 | 147 69 | | |
| 11 | 173.25 | 163.44 | | |
| 12 | 189.00 | 179.19 | | |
| End of 12 | 189.00 | 182.43 | | |
| 13 | 204.75 | 190.24 | | |
| 14 | 220.50 | 205.99 | | |
| 15 | 236.25 | 221.74 | | |
| 16 | 252.00 | 237.49 | | |
| 58 | 913.50 | 937.62 | | |
| 59 | 929.25 | 953.37 | | |
| 60 | 945.00 | 969.12 | | |
| End of 60 | 945.00 | 1000.00 | | |

WITNESSES

INVENTOR
FRANK A. GESELL

BY

ATTORNEYS

F. A. GESELL.
CONTROLLING MEANS FOR SAVING SYSTEMS COMBINED WITH INSURANCE PROTECTION.
APPLICATION FILED SEPT. 10, 1918.

1,329,120.

Patented Jan. 27, 1920.
2 SHEETS—SHEET 2.

DOE'S NATIONAL BANK
LOS ANGELES, CALIFORNIA

— o0o —

ACCOUNT LEDGER SHEET

ACCOUNT NO. 776

13

15

| Column 1<br>Monthly deposit number | Column 2<br>Deposits Total | Column 3<br>Amount depositor can withdraw | Column 4<br>Deposit for month of | Credited By |
|---|---|---|---|---|
| 30 | 31 | 32 | | 33 |
| End of 60 | 945.00 | 1000.00 | ACCOUNT NO. 776<br>MONTH_____ REC'D BY_____ | |
| 60 | 945.00 | 969.12 | ACCOUNT NO. 776<br>MONTH_____ REC'D BY_____ | |
| 59 | 929.25 | 953.37 | ACCOUNT NO. 776<br>MONTH_____ REC'D BY_____ | |
| 49 | 771.75 | 795.87 | ACCOUNT NO. 776<br>MONTH_____ REC'D BY_____ | |
| End of 48 | 756.00 | 781.18 | ACCOUNT NO. 776<br>MONTH_____ REC'D BY_____ | |
| 48 | 756.00 | 757.98 | ACCOUNT NO. 776<br>MONTH_____ REC'D BY_____ | |
| 47 | 740.25 | 742.23 | ACCOUNT NO. 776<br>MONTH_____ REC'D BY_____ | |
| 5 | 78.75 | 68.94 | ACCOUNT MONTH_____ | |
| 4 | 63.00 | 53.19 | | |
| 3 | 47.25 | 37.44 | 40 | |
| 2 | 31.50 | 21.69 | | |
| 1 | 15.75 | 5.94 | | |

WITNESSES

*Oliver H. Holmes*
*Rev. G. Hostetz*

INVENTOR
FRANK A. GESELL
BY *Munn & Co.*
ATTORNEYS

UNITED STATES PATENT OFFICE.

FRANK A. GESELL, OF LOS ANGELES, CALIFORNIA.

CONTROLLING MEANS FOR SAVING SYSTEMS COMBINED WITH INSURANCE PROTECTION.

1,329,120.  Specification of Letters Patent.  Patented Jan. 27, 1920.

Application filed September 10, 1918. Serial No. 253,431.

*To all whom it may concern:*

Be it known that I, FRANK A. GESELL, a citizen of the United States, and a resident of Los Angeles, in the county of Los Angeles and State of California, have invented a new and Improved Controlling Means for Saving Systems Combined with Insurance Protection, of which the following is a full, clear, and exact description.

The object of the invention is to provide a new and improved controlling means for a saving system combined with insurance protection arranged to safeguard periodical payments made by a depositor to a bank or other depository and to indicate the cash or surrender value of the savings and insurance account at any time. Another object is to enable the bank or other depository to keep the account with a customer in an exceedingly simple manner and without danger of clerical errors or requiring the keeping of special or separate account books or the like, thus reducing clerical assistance to a minimum at the same time providing a simple means which accurately shows the transactions at a glance.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in both views.

Figure 1 is a face view of the depositor's account sheet or leaf; and

Fig. 2 is a similar view of the bank's ledger account sheet or leaf.

The saving system combined with insurance protection for which the controlling means are designed is in general arranged as follows: A bank or other similar depository agrees with a depositor to accept say monthly payments of a predetermined amount (say $15.75) and at the end of a predetermined period, for instance, five years the bank pays over to the depositor $1000, that is, an amount in excess of the total payments by the depositor. It is agreed by the bank that the deposits bear interest at a fixed rate and are compounded at stated intervals, say every twelve months. There is also stipulated a cash withdrawal value whereby the depositor is enabled to withdraw at any time within the stiplated period (five years). There is further issued, by a life insurance company, a life insurance policy on the life of the depositor and to amounts which vary during the period of five years according to the difference between the total amount (say $1000) and the cash withdrawal value at the time, so that in case the depositor dies at any time within the stipulated period then the then existing cash withdrawal value paid by the bank and the then existing insurance amount aggregate the total amount of $1000 paid to the estate of the depositor. The life insurance policy is held by the bank and the premiums thereon are paid by the bank. The withdrawal value above mentioned is derived from the aggregate amounts of the deposits and interests less the fixed yearly insurance premiums paid by the bank to the insurance company. Minor stipulations between depositor and the bank may be provided or agreed upon and the above mentioned stipulations may be varied without deviating from the spirit of my invention. In order to safeguard the transactions involved between the bank and the depositor use is made of an exceedingly simple controlling means presently described in detail.

The controlling means consist essentially of two elements, of which I prefer to call one the depositor sheet 10 and the other the bank ledger sheet 11, the depositor sheet 10 being in the possession of the depositor and the other in the possession of the bank. Although the terms "sheets" are applied, it is evident that the instruments may be in the form of leaves and the depositor sheet or leaf 10 may form part of an agreement in writing setting forth in detail the method for compulsory saving with insurance protection as above outlined, and signed and executed by both the depositor and the bank. The bank ledger sheet or leaf 11 may be mounted in a loose leaf ledger account book as one of the leaves. Both sheets 10 and 11 are provided with suitable headings 12 and 13, as indicated in Figs. 1 and 2, and with identification means 14 and 15, preferably in the form of account numbers; for instance, as shown in Figs. 1 and 2, "No. 776." The depositor sheet 10 is provided with four columns 20, 21, 22 and 23, of which the column 20 is provided with the legend "Column 1, Monthly deposit number" and this column contains the monthly deposit numbers in consecutive order for a given period, say 60 months or 5 years, with the months at the end of each year 12, 24, 36, 48 and 60 duplicated. The column 21 is provided with the heading "Column 2, Deposits totals" and giving the total deposits opposite the corresponding monthly deposit numbers in column 20; thus, for instance, as shown in Fig. 1, it is supposed that the depositor agrees to pay monthly $15.75, noted opposite the monthly deposit "No. 1" and showing at the end of the twelfth month a total deposit of $189.00 and at the end of 60 months the total of $945. The column 22 is provided with the heading "Column 3, Amount depositor can withdraw" and it contains withdrawal values opposite the corresponding monthly deposit numbers and the deposit totals thus giving a withdrawal value for any month in the period stated; for instance, as shown $5.94 is the withdrawal value at the end of the first month, $21.69 is the withdrawal value at the end of the second month, and $1000 is the withdrawal value at the end of the sixtieth month. Column 23 is provided with the heading "Columns 4, Credited by ——— Deposit for month of ———" and this column 23 has blank spaces for a bank official to write in the month on which a deposit was made together with the signature of such official, thus providing a receipt opposite or in line with the corresponding row of numerals in the columns 20, 21 and 22.

The bank account ledger sheet is provided with four columns 30, 31, 32 and 33, of which the columns 30, 31 and 32 are like the columns 20, 21 and 22 with the difference only that the amounts in the said columns are given in reverse order. Thus the column 30 starts with the monthly deposit number of 60 and ends with 1, column 31 starts with the deposit total of $945 and ends with $15.75, and the column 32 starts with $1000 and ends with $5.94. The column 33 is provided with the same heading as that given for the column 23, but this column besides the heading is formed into detachable credit slips 40 one for each row of amounts given in the columns 30, 31 and 32. Each credit slip 40 bears the account number (776), the word "Month" with a space next to it to be filled in with the name of the month by the bank official receiving the payments, and it also bears the legend "Received by" with space for the signature of the said bank official. The back of each credit slip 40 is preferably gummed and the several slips can be detached by providing suitable perforations along which the slip may be torn off from the account ledger sheet and pasted over the corresponding writing in the column 23 of the depositor sheet 10. By comparison of Figs. 1 and 2 it will be noticed that the first four deposit slips 40 have been detached from the ledger sheet 11 and pasted into the column 23 of the depositor sheet 10 opposite the first four amounts in the columns 20, 21 and 22. By reference to Fig. 1 it will also be noticed that the legend "January, R. Roe" has been written in the row containing the numerals 5 in column 20, 78.75 in column 21, and 68.94 in column 22, and the fifth credit slip 40 has been partly torn out of the ledger sheet 11 to be completely removed and ultimately pasted over the said legend "January, R. Roe" in the column 23.

It will be noticed that by the arrangement described a simple means is provided for safeguarding the payments made by the depositor as the latter receives on the deposit sheet not only the signature of the bank official who receives the payment and the month at which it is made but also receives a deposit slip 40 pasted over the written legend. It will further be noticed that the official of the bank can see at a glance how many payments have been made by a depositor as a corresponding number of deposit slips are missing from the sheet 11.

From the foregoing it will be seen that one sheet practically controls the other and very little labor is required on the part of a bank official to indicate each transaction thus safeguarding the depositor and providing the statement for the bank and the depositor.

Although I have shown and described the controlling means applicable to a cash amount to be paid at the end of a predetermined period it is evident that the controlling means can be used for a depositor to acquire a bond of a certain value by monthly payments combined with insurance protection, or the buying of real estate or other property or commodity.

It will be noticed that the controlling means shown and described are practically error proof and indicate total deposits and current total credit balance resulting from the total deposit less amount deducted for life insurance premiums with added interest on accumulative balance and deposits.

The detachment of a deposit slip from the ledger sheet 11 indicates a corresponding deposit or payment by the depositor and at the same time the amounts in the columns 31 and 32 opposite this detached deposit slip indicate the total current deposit and the withdrawal value.

It is understood that under the terms "bank" and "depository" is included any banker or other person or any association or party carrying out the above described method by the controlling means set forth.

It is further understood that the depositor obtains all the usual advantages of saving owing to the interest the deposits are bearing and at the same time the depositor has the benefit of life insurance, the bank has the advantage of using the depositor's money in carrying out other banking operations and the life insurance company reaps the benefit of increased attractive business.

Having thus described my invention, I claim as new and desire to secure by Letters Patent:—

1. A controlling device for a saving system comprising in combination a depositor sheet and a bank sheet, the said sheets having like identifying data, the said sheets having each a series of columns of which one is provided with periodical deposit numbers, another indicates the total deposits opposite the corresponding deposit numbers, another indicates withdrawl values opposite the corresponding total deposits, and credit means on the said bank sheet indicating a credit for each periodical deposit number and the said depositor sheet having means for receiving such credit means opposite the corresponding periodical deposit number.

2. A controlling device for a saving system comprising in combination a depositor sheet and a bank sheet, the said sheets having like identifying data, the said sheets having each a series of columns of which one is provided with periodical deposit numbers, another indicates the total deposits opposite the corresponding deposit numbers, another indicates withdrawal values opposite the corresponding total deposits, and credit means on the said bank sheet indicating a credit for each periodical deposit number and the said depositor sheet having means for receiving such credit means opposite the corresponding periodical deposit number, the said credit means for each periodical deposit number having identifying data corresponding to that of the sheets.

3. A controlling device for a saving system comprising in combination a depositor sheet and a bank sheet, the said sheets having like identifying data, the said sheets having each a series of columns of which one is provided with periodical deposit numbers, another indicates the total deposits opposite the corresponding deposit numbers, another indicates the withdrawal values opposite the corresponding total deposits, the amounts appearing in the columns of the said bank sheet being in reverse order to the same amounts appearing in the depositor sheet, and credit means on the said bank sheet indicating a credit for each periodical deposit number and the said depositor sheet having means for receiving such credit means opposite the corresponding periodical deposit number.

4. A controlling device for a saving system comprising in combination a depositor sheet and a bank sheet, the said sheets having like identifying data and having each a series of columns of which one is provided with periodical deposit numbers, another indicates the total deposits opposite the corresponding deposit numbers, another indicates the withdrawal values opposite the corresponding total deposits, the said bank sheet having a plurality of detachable credit slips one for each periodical deposit number, the said depositor sheet having a space in which are fastened the said detached slips opposite the corresponding periodical deposit number.

5. A controlling device for a saving system comprising in combination a depositor sheet and a bank sheet, the said sheets having like identifying data and having each a series of columns of which one is provided with periodical deposit numbers, another indicates the total deposits opposite the corresponding deposit numbers, another indicates the withdrawal values opposite the corresponding total deposits, the amounts appearing in the columns of the said bank sheet being in reverse order to the same amounts appearing in the depositor's column, the said bank sheet having a fourth column provided with perforations to form detachable credit slips one for each periodical deposit number, each slip being detachable and bearing a credit legend, and the said depositor sheet having a fourth column normally blank and adapted to receive a receipt signature of a bank official for each periodical deposit number and adapted to receive a credit slip pasted over the said receipt signature to cover the same.

FRANK A. GESELL.